(12) United States Patent
Kurte et al.

(10) Patent No.: US 10,113,885 B2
(45) Date of Patent: Oct. 30, 2018

(54) METHOD AND ROTATIONAL ANGLE SENSOR FOR MEASURING AN ANGULAR POSITION OF A ROTATABLE SIGNAL-INDUCING UNIT

(71) Applicant: Miele & Cie. KG, Guetersloh (DE)

(72) Inventors: Jens Kurte, Bielefeld (DE); Frank Evertzberg, Marienfeld (DE); Johann Banmann, Guetersloh (DE); Oliver Buese, Erwitte (DE); Florian Schacht, Guetersloh (DE)

(73) Assignee: MIELE & CIE. KG, Guetersloh (DE)

( * ) Notice: Subject to any disclaimer, the term of this patent is extended or adjusted under 35 U.S.C. 154(b) by 114 days.

(21) Appl. No.: 15/278,042

(22) Filed: Sep. 28, 2016

(65) Prior Publication Data

US 2017/0115136 A1 Apr. 27, 2017

(30) Foreign Application Priority Data

Oct. 23, 2015 (DE) .......................... 10 2015 118 083

(51) Int. Cl.
*G01D 5/241* (2006.01)

(52) U.S. Cl.
CPC ......... *G01D 5/2412* (2013.01); *G01D 5/2415* (2013.01)

(58) Field of Classification Search
CPC ........................................ G01D 5/241–5/2415
See application file for complete search history.

(56) References Cited

U.S. PATENT DOCUMENTS

| 4,779,094 A | * | 10/1988 | Lee | ....................... G01D 5/2415 324/660 |
| 5,077,635 A | * | 12/1991 | Bollhagen | ............ G01D 5/2412 318/662 |
| 5,736,865 A | * | 4/1998 | Nelson | ................. G01D 5/2415 324/660 |

(Continued)

FOREIGN PATENT DOCUMENTS

| DE | 3711062 C2 | 10/1988 |
| DE | 102009043977 A1 | 6/2010 |

(Continued)

*Primary Examiner* — Walter L Lindsay, Jr.
*Assistant Examiner* — Milton Gonzalez
(74) *Attorney, Agent, or Firm* — Leydig, Voit & Mayer, Ltd.

(57) ABSTRACT

A method for measuring an angular position of a rotatable signal-inducing unit uses a sensor unit electrically isolated from the signal-inducing unit. The signal-inducing unit has a center electrode disposed in a signal-inducing unit plane and a rotary electrode disposed in the signal-inducing unit plane, the rotary electrode being conductively connected to the center electrode and laterally offset therefrom. The sensor unit has a first sensor electrode disposed in a sensor plane and at least one second sensor electrode disposed in the sensor plane, the sensor electrodes being arranged in a circle around a ground electrode disposed in the sensor plane, the signal-inducing unit plane and the sensor plane being oriented substantially parallel to one another. The signal-inducing unit is supported so as to be rotatable about the center electrode and the rotary electrode is movable along a circular path in the region of the sensor electrodes.

7 Claims, 4 Drawing Sheets

(56) References Cited

U.S. PATENT DOCUMENTS

| | | | | |
|---|---|---|---|---|
| 5,910,781 A * | 6/1999 | Kawamoto | ............ | G01D 5/2405 |
| | | | | 318/662 |
| 7,023,684 B1 | 4/2006 | Chen | | |
| 2010/0148801 A1 | 6/2010 | Uchida et al. | | |
| 2014/0176162 A1 * | 6/2014 | Reus | .................... | G01D 5/2412 |
| | | | | 324/676 |

FOREIGN PATENT DOCUMENTS

| | | |
|---|---|---|
| EP | 0725482 A1 | 8/1996 |
| EP | 0844325 A2 | 5/1998 |
| EP | 2270433 A2 | 1/2011 |
| EP | 2422009 B1 | 2/2012 |

\* cited by examiner

METHOD AND ROTATIONAL ANGLE SENSOR FOR MEASURING AN ANGULAR POSITION OF A ROTATABLE SIGNAL-INDUCING UNIT

CROSS-REFERENCE TO PRIOR APPLICATION

Priority is claimed to German Patent Application No. DE 10 2015 118 083.9, filed on Oct. 23, 2015, the entire disclosure of which is hereby incorporated by reference herein.

FIELD

The present invention relates to a method and a rotational angle sensor for measuring an angular position of a rotatable signal-inducing unit for a household appliance, as well as to a sensor unit, a signal-inducing unit and an evaluation unit for a rotational angle sensor, and finally to a household appliance having a rotational angle sensor.

BACKGROUND

For controlling the operation of a household appliance using a conventional rotary selector switch, a control panel must have a hole therethrough for a shaft to transmit the rotary position of the rotary selector switch to the evaluation electronics disposed behind the control panel. Until now, the evaluation of the rotary position has been performed on the operating and display electronics behind the fascia panel. Depending on the appliance, incremental or absolute evaluation methods may be used. Commonly used technologies include, inter alia, optical evaluation using encoding disks, encoders, bit generators, potentiometers and mechanical switching contacts. All of these technologies require a through-hole in the fascia panel to mechanically transmit the rotational angle.

EP 0 844 325 A2 describes an operating and display device.

SUMMARY

In an embodiment, the present invention provides a method for measuring an angular position of a rotatable signal-inducing unit using a sensor unit electrically isolated from the signal-inducing unit. The signal-inducing unit has a center electrode disposed in a signal-inducing unit plane and a rotary electrode disposed in the signal-inducing unit plane, the rotary electrode being conductively connected to the center electrode and laterally offset therefrom. The sensor unit has a first sensor electrode disposed in a sensor plane and at least one second sensor electrode disposed in the sensor plane, the sensor electrodes being arranged in a circle around a ground electrode disposed in the sensor plane, the signal-inducing unit plane and the sensor plane being oriented substantially parallel to one another. The signal-inducing unit is supported so as to be rotatable about the center electrode, the rotary electrode is movable along a circular path in the region of the sensor electrodes, and the center electrode is aligned with the ground electrode. The ground electrode can influence a capacitance of the center electrode. The rotary electrode can influence a capacitance of at least one of the sensor electrodes according to the angular position of the signal-inducing unit. The method includes disconnecting the ground electrode from a ground potential; determining a first reference capacitance value representative of an instantaneous capacitance of the first sensor electrode and at least one second reference capacitance value representative of an instantaneous capacitance of the second sensor electrode; connecting the ground electrode to the ground potential; determining a first capacitance value representative of an instantaneous capacitance of the first sensor electrode and at least one second capacitance value representative of an instantaneous capacitance of the second sensor electrode; and calculating an angle value representative of the angular position of the signal-inducing unit using the reference capacitance values and the capacitance values.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a method for measuring an angular position of a rotatable signal-inducing unit, a rotational angle sensor for measuring an angular position of a rotatable signal-inducing unit, a sensor unit, a signal-inducing unit, and an evaluation unit for a rotational angle sensor, as well as a household appliance.

In the approach presented here, the wearing mechanical connection between a rotary switch and evaluation electronics can be eliminated. This results in reduced manufacturing effort and cost. In the case of injection-molded plastic panels, manufacture is facilitated by the elimination of weld lines. Due to the absence of a through-hole, liquids and dirt can be prevented from entering the appliance.

Presented is a touch and contactless rotary selector switch for controlling the operation of a household appliance using capacitive sensor surfaces, whereby it is possible to dispense with a through-hole.

Presented is a method for measuring an angular position of a rotatable signal-inducing unit, the signal-inducing unit having a center electrode disposed in a signal-inducing unit plane and a rotary electrode that is disposed in the signal-inducing unit plane, conductively connected to the center electrode and laterally offset therefrom, a sensor unit having a first sensor electrode disposed in a sensor plane and at least one second sensor electrode disposed in the sensor plane, the sensor electrodes being arranged in a circle around a ground electrode disposed in the sensor plane, the signal-inducing unit being electrically isolated from the sensor unit, the signal-inducing unit plane and the sensor plane being oriented substantially parallel to one another, and the center electrode being aligned with the ground electrode, and the ground electrode being adapted to influence a capacitance of the center electrode, the signal-inducing unit being supported so as to be rotatable about the center electrode, and the rotary electrode being movable along a circular path in the region of the sensor electrodes and adapted to influence a capacitance of at least one of the sensor electrodes according to the angular position of the signal-inducing unit, the method including the following steps:

disconnecting the ground electrode from a ground potential;

determining a first reference capacitance value representative of an instantaneous capacitance of the first sensor electrode and at least one second reference capacitance value representative of an instantaneous capacitance of the second sensor electrode;

connecting the ground electrode to the ground potential;

determining a first capacitance value representative of an instantaneous capacitance of the first sensor electrode and at least one second capacitance value representative of an instantaneous capacitance of the second sensor electrode;

calculating an angle value representative of the angular position of the signal-inducing unit using the reference capacitance values and the capacitance values.

The electrodes of the signal-inducing unit and sensor unit may have a flat design. In the calculating step, a change in capacitance is calculated for each sensor electrode between the reference capacitance values and the capacitance values. At sensor electrodes which are influenced by the rotary electrode, the change in capacitance is greater than at the sensor electrodes that are not influenced by the rotary electrode. If the rotary electrode partially overlaps both the first sensor electrode and the second sensor electrode, then the angle value can be calculated form a ratio of the changes in capacitance.

The steps of the method may be repeated cyclically. This makes it possible to filter out varying environmental influences, because the capacitance values are in each instance referenced directly to the previously determined reference capacitance values.

The approach presented here also provides an evaluation unit that is adapted for performing, controlling and implementing the steps of a variant of a method presented here in corresponding devices. The object underlying the present invention can also be achieved rapidly and efficiently through this embodiment variant of the present invention in the form of an evaluation unit.

The evaluation unit may be adapted to read input signals and determine and provide output signals on the basis of the input signals. An input signal may be, for example, a sensor signal which can be read via an input interface of the evaluation unit. An output signal may be a control signal or a data signal which can be provided at an output interface of the evaluation unit. The evaluation unit may be adapted to determine the output signals on the basis of a processing instruction implemented in hardware or software. For this purpose, the evaluation unit may, for example, include a logic circuit, an integrated circuit or a software module, and may, for example, be implemented as a discrete device or may be included in a discrete device.

Further presented is a sensor unit for a rotational angle sensor, the sensor unit having a first sensor electrode disposed in a sensor plane and at least one second sensor electrode disposed in the sensor plane, the sensor electrodes being arranged in a circle around a ground electrode disposed in the sensor plane.

Also presented is a signal-inducing unit for a rotational angle sensor, the signal-inducing unit having a center electrode disposed in a signal-inducing unit plane and a rotary electrode that is disposed in the signal-inducing unit plane, conductively connected to the center electrode and laterally offset therefrom.

Presented is a rotational angle sensor for measuring an angular position of a rotatable signal-inducing unit according to the approach presented here, the rotational angle sensor having the following features:

a sensor unit according to the approach presented here, a center of the ground electrode defining a center of the center electrode; and an evaluation unit according to the approach presented here, the evaluation unit being connected to the sensor electrodes and the ground electrode.

The rotational angle sensor may include the signal-inducing unit, the signal-inducing unit plane being oriented substantially parallel to the sensor plane.

Further presented is a household appliance having a rotational angle sensor according to the approach presented here, the sensor plane of the sensor device being disposed on an inner side of a control panel of the household appliance and the signal-inducing unit plane being disposed on an outer side of the control panel, the signal-inducing unit being non-rotatably coupled to a control element of the household appliance and rotatably supported on the outer side, an axis of rotation of the control element substantially corresponding to the centers of the center electrode and the ground electrode, and the evaluation unit being connected to the sensor electrodes and the ground electrode.

The sensor electrodes, the ground electrode, the center electrode and the rotary electrode may be configured as electrically conductive surfaces. The sensor electrodes and the ground electrode may be in film form.

The sensor electrodes may have the shape of annular segments. The annular segment shape allows the sensor electrodes to completely cover an area of an annular ring. This makes it possible to reliably calculate the angle value for any angular position.

The ground electrode may be circular in shape. The ground electrode may fill the inner circle of the annular ring of sensor electrodes.

The sensor unit may have at least one further sensor electrode disposed in the sensor plane. In the case of three sensor electrodes, the angle value may be calculated over a full circle. The angular position may be calculated continuously.

Also advantageous is a computer program product or computer program having program code which may be stored on a machine-readable carrier or storage medium, such as a semiconductor memory, a hard-disk memory or an optical memory. If the program product or program is executed on a computer or a device, then the program product or program can be used to perform, implement and/or control the steps of the method in accordance with one of the above-described embodiments.

The approach described can be used in connection with household appliances from different product ranges, where until now cycle selection and menu navigation have been performed via an electromechanical rotary selector switch. It is now no longer necessary to transmit the rotational movement from the rotary selector switch through a supported shaft into the housing to a detent mechanism and electronic components for evaluating rotational angles on the operating and display electronics. It is also possible to dispense with a through-hole or bore in the fascia panel. This makes it possible to reduce manufacturing costs, especially in the case of glass panels of built-in kitchen appliances. Also eliminated are weld lines in injection-molded plastic panels. Entry of liquids and dirt is prevented, thus eliminating the need for further design measures for discharging the liquids. This, again, makes it possible to save costs.

Figure 1:
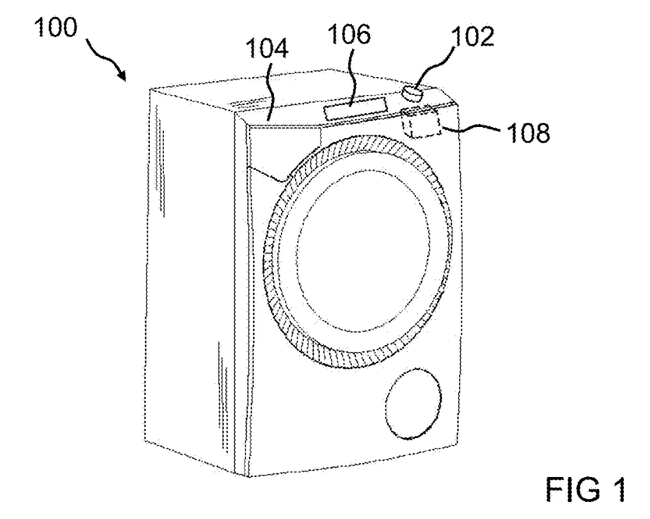
FIG. 1 is a view of a household appliance having a control element.

FIG. 1 shows a household appliance 100 having a control element 102. Household appliance 100 is here an automatic washing machine 100 or a laundry dryer 100. Household appliance 100 may also be, for example, a kitchen appliance, such as a range or baking oven. Household appliance 100 has a control panel 104. Control panel 104 forms part of a front of household appliance 100. Control element 102 is disposed on control panel 104. Further, a display 106 is embedded in control panel 104. Control element 102 is a rotary selector switch 102 for selecting an operating mode of household appliance 100. Rotary selector switch 102 is disposed on an outer side of control panel 104.

Here, an angular position of rotary selector switch 102 is read by a rotational angle sensor in accordance with the approach presented here. Rotary selector switch 102 is non-rotatably coupled to a signal-inducing unit of the rotational angle sensor. Control panel 104 does not have a through-hole in the region of rotary selector switch 102. A sensor unit of the rotational angle sensor is disposed on an inner side of control panel 104. The sensor unit is located opposite the signal-inducing unit. The sensor unit is connected to an evaluation unit of the rotational angle sensor. The evaluation unit forms part of control electronics 108 of household appliance 100. Control electronics 108 are disposed inside household appliance 100 in the region of control panel 104.

The approach presented here enables touch and contactless determination of a rotary position through a control panel 104 using capacitive sensor surfaces, By integrating a detent mechanism into rotary selector switch 102, it is possible to dispense with a through-hole in control panel 104. Thus, liquids and dirt cannot enter appliance 100. By avoiding the through-hole and the additional design measures associated therewith, it is possible to reduce manufacturing costs. In addition, the capacitive evaluation method presented here is characterized by very cost-effective system components.

Figure 2:
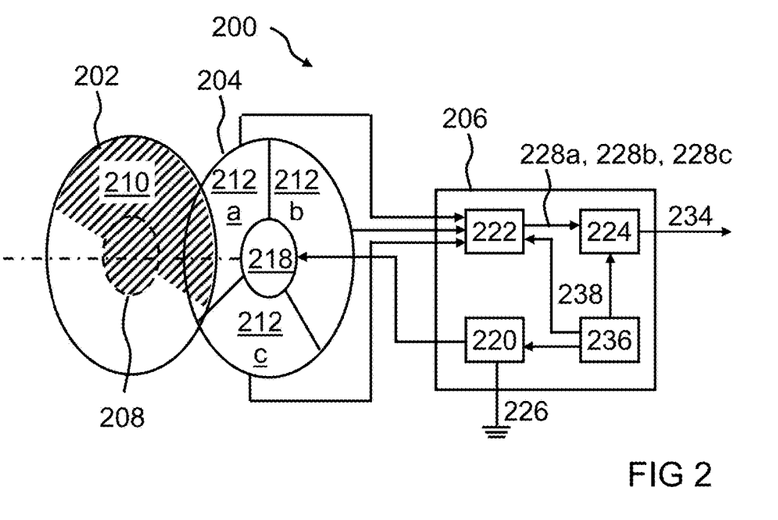
FIG. 2 is a block diagram of a rotational angle sensor according to an exemplary embodiment.

FIG. 2 shows a block diagram of a rotational angle sensor 200 according to an exemplary embodiment. Rotational angle sensor 200 substantially corresponds to that installed in the household appliance of FIG. 1. Rotational angle sensor 200 is composed of three parts: a rotatable signal-inducing unit 202, a sensor unit 204, and an evaluation unit 206. Signal-inducing unit 202 is oriented such that its axis of rotation substantially coincides with a center of sensor unit 204.

Signal-inducing unit 202 and sensor unit 204 have a flat design. Signal-inducing unit 202 and the sensor unit have circular, similar active surfaces. The active surfaces are oriented substantially parallel to one another. Signal-inducing unit 202 has a center electrode 208 and a rotary electrode 210. Center electrode 208 and rotary electrode 210 are here sub-areas of a continuous electrically conductive surface. Center electrode 208 is round and disposed at the center of the active surface. Rotary electrode 210 is disposed in a semicircle around center electrode 208. Sensor unit 204 has three sensor electrodes 212a, 212b, 212c and a ground electrode 218. Sensor electrodes 212a, 212b, 212c are configured as sectors of an annular ring and are equal in size. Thus, a sensor electrode 212 extends over 120°. Ground electrode 218 is circular and disposed at the center of the annular ring. Ground electrode 218 and center electrode 208 are approximately equal in size. Electrodes 212, 218 are configured as electrically conductive surfaces and are electrically isolated from each other.

Evaluation unit 206 has a switching device 220, a determining device 222, and a calculating device 224. Switching device 220 is connected to ground electrode 218. Determining device 222 is connected to the three sensor electrodes 212a, 212b, 212c. Calculating device 224 is connected to determining device 222. Switching device 220 is adapted to connect ground electrode 218 to a ground potential 226 or disconnect ground electrode 218 from ground potential 226. Determining device 222 is adapted to determine an instantaneous electrical capacitance of first sensor surface 212a and convert it to a first capacitance value 228a. Further, determining device 222 is adapted to determine the instantaneous electrical capacitance of second sensor surface 212b and convert it to a second capacitance value 228b. Moreover, the determining device is adapted to determine the instantaneous electrical capacitance of third sensor electrode 212c and convert it to a third capacitance value 228c. Calculating device 224 is adapted to calculate an angle value 234 based on capacitance values 228. In the process, the electrical capacitances are determined, once as reference capacitances when ground electrode 218 is disconnected from ground potential 226 and once as operating capacitances when ground electrode 218 is connected to ground potential 226. Calculating device 224 calculates the angle value 234 representing the angular position of signal-inducing unit 202 from the reference capacitances and operating capacitances represented by the respective capacitance values 228.

In an exemplary embodiment, evaluation unit 206 has a control device 236. Control device 236 is connected to switching device 220 and determining device 222, as well as to calculating device 224. Control device 236 is adapted to control the measurement of the rotational angle using control signals 238. To this end, devices 220, 222, 224 are controlled in a cyclic control sequence. Within a cycle, ground electrode 218 is disconnected from ground potential 226. Subsequently, the capacitances of sensor electrodes 212 are determined as reference capacitance values 228 and stored in the calculating device. Then, ground electrode 218 is connected to ground potential 226. After that, the capacitances of sensor electrodes 212 are determined as capacitance values 228. A capacitance differential is calculated for each sensor electrode 212 using the stored reference capacitance values 228 and capacitance values 228. The sensor electrode 212 having the highest degree of overlap with rotary electrode 210 has the greatest capacitance differential. The sensor electrode 212 having the lowest degree of overlap with the rotary electrode has the smallest capacitance differential. Thus, the angular position of signal-inducing unit 202 can be inferred from a ratio of the capacitance differentials.

The determination of the rotary position is performed using capacitive sensor surfaces and an evaluation method such as can be used, for example, in touch sliders. The potential difference required for capacitive evaluation, which is usually caused by the approach/touch of a human finger, is produced by the rotor electrode 202 coupled to ground 226. Rotor electrode 202 is a certain geometric shape of conductive material, such as copper, which is surrounded by non-conductive material in substantially one plane. This rotor electrode 202, together with a detent mechanism, may be integrated into the rotary selector switch, thereby forming a compact assembly that can be mounted externally on the fascia panel. Rotational movement of rotary selector switch 200 causes rotor electrode 202 to rotate as well. Depending on the rotary position, the rotor electrode overlaps different sensor surfaces 212, thereby influencing the capacitances thereof. The arrangement of sensor surfaces 212 behind the fascia panel is shown exemplarily in FIG. 2. A ground surface 218 at the center, three sensor surfaces 212; i.e., stator electrodes 212, arranged rotationally symmetrically in an annular ring around the center. This configuration is designed, for example, to detect 12 detent positions/cycles in a very simple manner. The number of sensor surfaces 212 can be adapted for a different number of detent positions.

Using the approach presented here, the absolute rotary position can be determined after a system restart. To determine the rotary position, central ground surface 218 is cyclically reconfigured and sensor surfaces 212 are cyclically initialized. Because of the capacitive coupling of rotor electrode 202, the switching of ground surface 218 between the two configuration states "high-ohmic input" and "ground potential or ground" results in a measurable change in capacitance of the overlapped sensor surface 212. By simultaneously initializing sensor surfaces 212 in the "high-ohmic input" state, only the potential difference is measured by the reconfiguration to "ground." All disturbing environmental conditions, such as, for example, the approach of a human hand to the rotary selector switch or temperature drifts, are filter out in this way.

Figure 3:
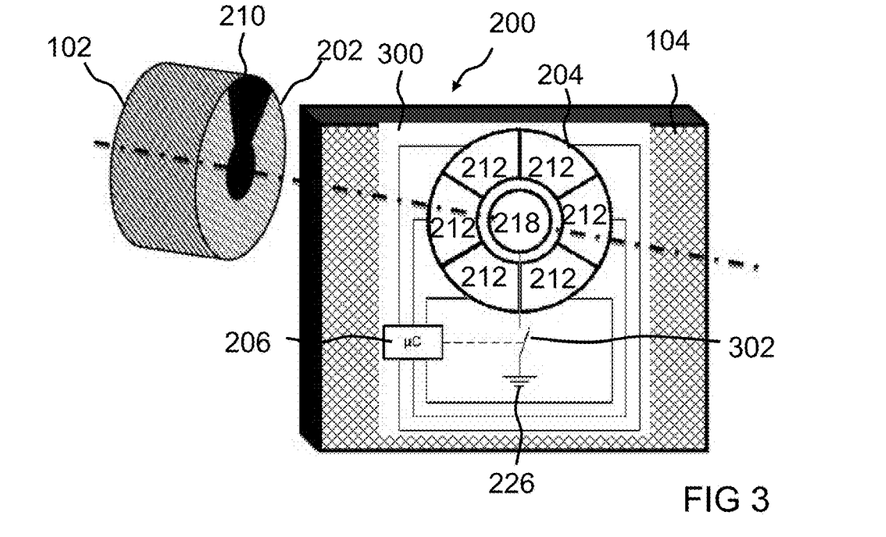
FIG. 3 is a view showing a rotational angle sensor with a signal-inducing unit on a control panel.

FIG. 3 shows a rotational angle sensor 200 with a signal-inducing unit 202 on a control panel 104 of a household appliance. Rotational angle sensor 200 substantially corresponds to that of FIG. 2. In contrast to FIG. 2, rotational angle sensor 200 has here six sensor electrodes 212. Sensor electrodes 212 are configured as annular sectors of equal size. Evaluation unit 206 is here a microcontroller 206. Microcontroller 206 and sensor unit 204 are mounted together on a common support 300. Support 300 is disposed on an inner side of control panel 104. In particular, support 300 is adhesively bonded to the control panel to prevent an air gap between sensor electrodes 212 and control panel 104.

The switching device of microcontroller 206 is connected via a control line to a switch 302 or relay 302. Switch 302 connects ground electrode 218 to ground potential 226 or disconnects it therefrom depending on its position. Signal-inducing unit 202 is integrally connected to rotary selector switch 102 of the household appliance. Rotary electrode 210 has a shape substantially similar to the shape of a sensor electrode 212 in conjunction with ground electrode 218.

The potential produced over a sensor surface 212 by signal-inducing unit 202, which may also be referred to as rotor electrode 202, allows determination of the rotary position of control element 102. Capacitive evaluation methods are based on a relative change in capacitance. The approach presented here uses a special measuring method, such as is illustrated, for example, in FIG. 7. This allows for absolute determination of the rotary position without having to touch or turn control element 202. Otherwise, determination of the rotary position would only be possible after a turn of control device 202 because such turning results in a relative change in capacitance at sensor surfaces 212.

The measurement cycle starts with the configuration of ground surface 218 as a high-ohmic input at microcontroller 206. This configuration corresponds to an open switch 300 between ground surface 218 and ground potential 226. Subsequently, the capacitances of all sensor surfaces 212 are successively measured and stored as reference values. This is followed by the reconfiguration of ground surface 218, which is now configured as an output instead of a high-ohmic input and connected to ground potential 226. This configuration corresponds to a closed switch 300 between ground surface 218 and ground potential 226. This ground potential 226 is coupled via rotor electrode 202 to at least one of the sensor surfaces 212 and thereby increases the capacitance of this sensor surface 212. The capacitances of all sensor surfaces 212 are measured again and compared to the previously stored reference values. A sensor surface 212 overlapped by rotor electrode 202 exhibits a significantly greater change in capacitance than a sensor surface 212 that is not overlapped. Thus, it is possible to determine the absolute rotary position of control element 102. The measurement cycle is performed continuously and restarts with the reconfiguration of ground surface 218 as a high-ohmic input and the generation of reference values for the sensor capacitances.

In addition to the absolute determination of the rotary position, another advantage of this measuring method is the robustness of the system. Because of the repeated initialization of sensor surfaces 212 in each measurement cycle, it is possible to compensate for any change in environmental conditions, such as temperature, humidity, aging, approach of a conductive object, such as a hand.

Figure 4:
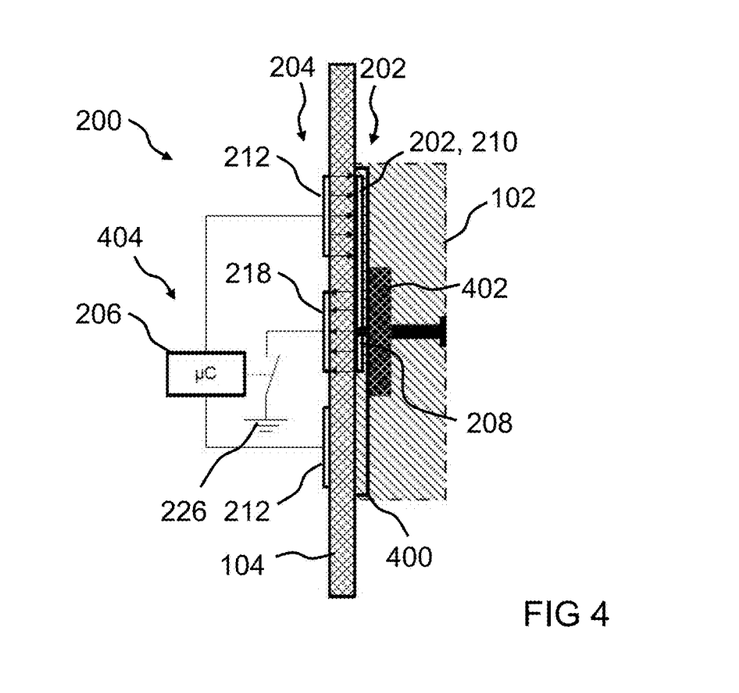
FIG. 4 is a cross-sectional view of a rotational angle sensor with a signal-inducing unit according to an exemplary embodiment.

FIG. 4 shows a cross-sectional view of a rotational angle sensor 200 with a signal-inducing unit 202 according to an exemplary embodiment. Rotational angle sensor 200 substantially corresponds to that of FIG. 3. Signal-inducing unit 202 is here mounted in a holding device 400 connected to the outer side of control panel 104. Attached to holding device 400 is a detent mechanism 402, which defines discrete angular positions for signal-inducing unit 202. In other words, signal-inducing unit 202 engages in detent mechanism 402 at discrete angular positions.

Sensor electrodes 212 and ground electrode 218 are here disposed directly on the inner side of control panel 104. This illustration shows how the electrodes of sensor unit 204 and signal-inducing unit 202 influence one another. Rotary electrode 210 in each case influences the electrical capacitance of one or more sensor electrodes 212. Ground electrode 218 influences the electrical capacitance of center electrode 208, which in turn influences rotary electrode 210 because it is electrically conductively connected thereto.

In order to achieve a greatest possible influence, signal-inducing unit 202 is disposed as close as possible to the outer side of control panel 104.

Evaluation unit 206 is here is disposed on a separate circuit board 404 at a distance from sensor unit 204.

On the back side of control panel 104 of a household appliance, such as, for example, a washing machine, there is disposed a plurality of sensor surfaces 212 which are arranged rotationally symmetrically around a central ground surface 218. Thus, the individual sensor surfaces 212 form sectors of an annular ring. All surfaces 212, 218 are galvanically isolated from each other and are composed of electrically conductive material. Sensor surfaces 212 may take the form of, for example, copper on PCB or printed conductors, or may be in the form of conductive films adhesively bonded directly to control panel 104. A control element 102 in the form of a rotary selector switch 102 is rotatably mounted on the front of control panel 104 centrally over sensor surfaces 212. Control element 102 is composed of an electrically insulating base member of cylindrical shape. The base member has an electrically conductive element 202, for example, of copper, which may be referred to as rotor electrode 202. Rotor electrode 202 is mounted on the control-panel-facing side of control element 102 and has a geometry 210 corresponding to that of ground electrode 218 and an annular sector 212. Thus, it is ensured that ground surface 218 and, depending on the rotary position, at least one of the sensor surfaces 212 are overlapped at all times.

All surfaces 212, 218 are electrically connected to evaluation electronics 206, here a microcontroller (µC) 206. Using common evaluation methods, it is possible to measure the capacitances of sensor surfaces 212 relative to ground potential 226. The overlapping of a sensor surface 212 with rotor electrode 202 results in a change in the capacitive near field, and thus in a change in capacitance of this sensor surface 212. The magnitude of the change in capacitance is dependent on the degree of overlap. The influence of rotor electrode 202 on the capacitance of a sensor surface 212 is based on the capacitive coupling of central ground surface 218 to ground potential 226. In the case of touch-sensor applications, this ground potential may be generated by the approach of a human finger.

Depending on the structural implementation, the distance between control element 102 and control panel 104 may vary between sliding contact and a distance of a few tenths of a millimeter. The maximum distance at which the smallest change in capacitance that can still be reliably evaluated is obtained is dependent on the panel material used, the material thickness and the area of sensor and ground surfaces 212, 218. In this connection, the relative permittivity is important. Control panel 104 may, for example, be made of any of the commonly used materials, such as plastics or glass. Due to the low relative permittivity of air, the distance between control element 102 and control panel 104 should be as small as possible to obtain a maximum change in capacitance. This is why sensor and ground surfaces 212, 218 are mounted directly to the back side of control panel 104 without an air gap therebetween. Sensor surfaces 212 are identical in geometry and area. Ground surface 218 should have the same area as a sensor surface 212. A maximum size of the surfaces is governed by the space available in control element 102. In an exemplary embodiment, the six sensor surfaces 212 have an outer diameter of 40 mm and an area of 133 mm² each.

Figure 5:
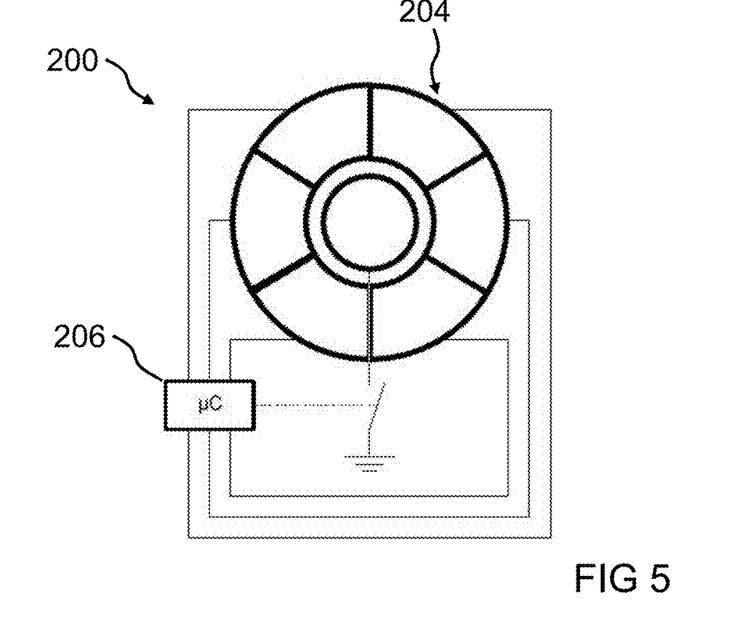
FIG. 5 is a view of a rotational angle sensor according to an exemplary embodiment.

FIG. 5 shows a rotational angle sensor 200 according to an exemplary embodiment. Rotational angle sensor 200 substantially corresponds to that of FIG. 3. In contrast to FIG. 3, sensor unit 204 and evaluation unit 206 are not mounted on a common support.

Sensor surfaces 212; i.e., stator electrodes 212, are made from conductive material and isolated from one another and may, for example, take the form of a film adhesively bonded from the rear to the fascia panel or as a conductive layer printed on glass panels. The rotor electrode is also made of conductive material and is surrounded by non-conductive material.

The approach presented here provides the advantage that no through-hole is needed in the fascia panel because of the touchless determination of the rotational angle. This makes it possible to prevent entry of liquids and dirt while at the same time reducing manufacturing and components costs. The modification of the central ground surface permits absolute determination of the rotational angle even after a system restart without having to touch or turn the rotary selector switch.

The approach presented here can be used on appliances whose operating concept provides for the use of rotary selector switches. In this connection, the maximum possible material thickness that permits reliable detection must be considered depending on the panel material, such as plastic or glass.

Figure 6:
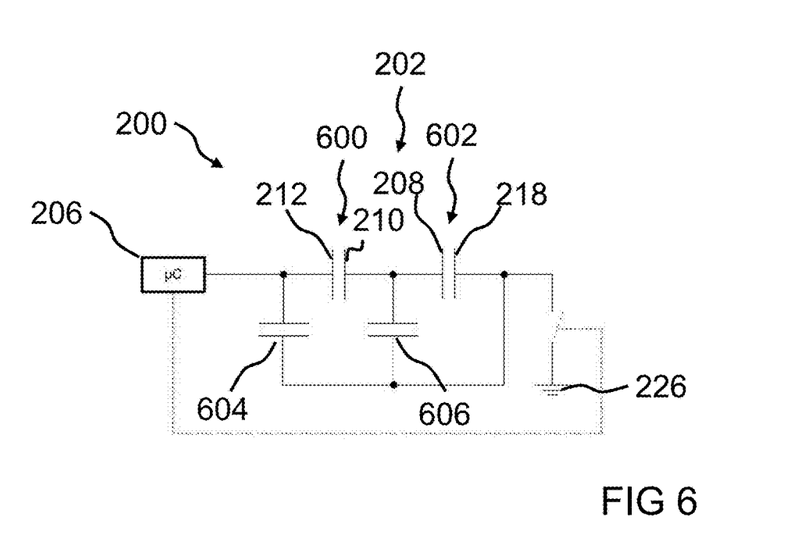
FIG. 6 is an equivalent circuit diagram of a rotational angle sensor according to an exemplary embodiment.

FIG. 6 shows an equivalent circuit diagram of a rotational angle sensor 200 according to an exemplary embodiment. The equivalent circuit diagram illustrates a series circuit constituted by evaluation unit 206, a first capacitance 600, a second capacitance 602, and ground potential 226. The first capacitance is provided by a single sensor electrode 212 and rotary electrode 210. Second capacitance 602 is provided by center electrode 208 and ground electrode 218. Ground potential 226 is connected through the switching device to ground potential 218.

A first parasitic capacitance 604 acts between evaluation unit 206 and first capacitance 600. A second parasitic capacitance 606 acts on signal-inducing unit 202. Parasitic capacitances 604, 606 represent, for example, environmental influences. Parasitic capacitances 604, 606 are connected to ground electrode 218 on one side.

The equivalent circuit diagram of FIG. 6 illustrates that, seen from evaluation unit 206, a series connection of the relevant capacitances $C_S$ and $C_S$ 600, 602 to ground potential 226 is obtained. In this connection, $C_S$ 600 is the capacitance between sensor surface 212 and rotor electrode 202 and $C_M$ 602 is the capacitance between rotor electrode 202 and ground surface 218. $C_{par1}$ and $C_{par2}$ 604, 606 are disturbing influences caused by parasitic capacitances.

Figure 7:
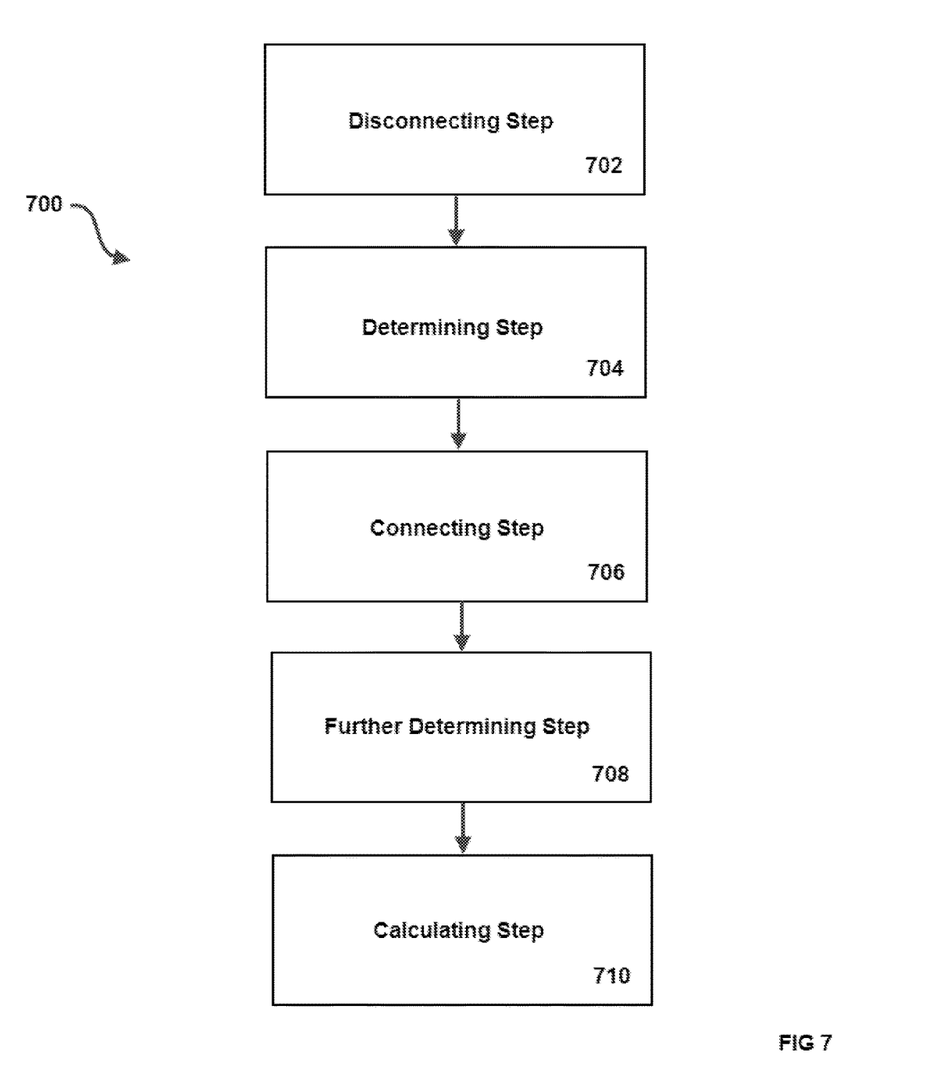
FIG. 7 is a flow diagram of a method for measuring an angular position according to an exemplary embodiment.

FIG. 7 shows a flow diagram of a method 700 for measuring an angular position according to an exemplary embodiment. One problem encountered when using capacitive evaluation methods in combination with a rotor electrode lies in the determination of the absolute rotary position after switching on the appliance and without touching the rotary selector switch. Well-known methods are based on a relative change in capacitance. When the appliance is switched on, the sensor surfaces are initialized and their capacitances are measured. If there is no change in rotational angle or touching of the rotary selector switch, then no change in capacitance can be measured at the sensor surfaces. Thus, it is not possible to determine the rotary position. The approach presented here describes a method 700 that solves this problem. Method 700 can be performed on an angle sensor such as is illustrated in the preceding figures. Method 700 includes a disconnecting step 702, a determining step 704, a connecting step 706, a further determining step 708, and a calculating step 710. In disconnecting step 702, a ground electrode of the angle sensor is disconnected form a ground potential. In determining step 704, instantaneous electrical capacitances of sensor electrodes of the angle sensor are converted to reference capacitance values. In connecting step 706, the ground electrode is connected to the ground potential. In the further determining step 708, the instantaneous capacitances of the sensor electrodes are converted to capacitance values. In calculating step 710, an angle value representative of the angular position is calculated using the reference capacitance values and the capacitance values.

In other words, what is presented here is a contactless determination of rotational angles through the control panel of a household appliance.

Because the absolute rotary position can be determined even without touching the rotary selector switch, a further application may be envisaged for this method 700. Because touch controllers are already present in many appliances, and due to the very cost-effective system components, the described capacitive determination of rotational angles could also be used in conjunction with a through-hole as a low-wear replacement for the existing evaluation methods directly on the operating and display electronics. The sensor surfaces may be inexpensively etched as a conductive pattern directly on the operating and display electronics. The rotor electrode may be supported by suitable guide means over the sensor surfaces with an air gap of a few tenths of a millimeter therebetween. When the rotary selector switch is turned, this change in rotational angle is transmitted to the supported rotor electrode through the shaft and the through-hole. As described earlier, the degree of overlap of the sensor surfaces changes, thereby enabling absolute position determination.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for measuring an angular position of a rotatable signal-inducing unit, including:
    a signal-inducing unit, which has a center electrode disposed in a signal-inducing unit plane and a rotary electrode disposed in the signal-inducing unit plane, the rotary electrode being conductively connected to the center electrode and laterally offset therefrom;
    a sensor unit electrically isolated from the signal-inducing unit and having a first sensor electrode disposed in a sensor plane and at least one second sensor electrode disposed in the sensor plane, the sensor electrodes being arranged in a circle around a ground electrode disposed in the sensor plane, the signal-inducing unit plane and the sensor plane being oriented substantially parallel to one another,
    wherein the signal-inducing unit is supported so as to be rotatable about the center electrode, the rotary electrode is movable along a circular path in the region of the sensor electrodes, and the center electrode is aligned with the ground electrode,
    wherein the ground electrode is configured to influence a capacitance of the center electrode, and
    wherein the rotary electrode is configured to influence a capacitance of at least one of the sensor electrodes according to the angular position of the signal-inducing unit,
    the method comprising the following steps:
    disconnecting the ground electrode from a ground potential;
    determining a first reference capacitance value representative of an instantaneous capacitance of the first sensor electrode and at least one second reference capacitance value representative of an instantaneous capacitance of the second sensor electrode;
    connecting the ground electrode to the ground potential;
    determining a first capacitance value representative of an instantaneous capacitance of the first sensor electrode and at least one second capacitance value representative of an instantaneous capacitance of the second sensor electrode; and
    calculating an angle value representative of the angular position of the signal-inducing unit using the reference capacitance values and the capacitance values.

2. The method as recited in claim 1, wherein the steps of the method are repeated cyclically.

3. An evaluation unit for a rotational angle sensor, the evaluation unit being configured to perform the steps of the method according to claim 1.

4. A rotational angle sensor for measuring an angular position of a rotatable signal-inducing unit, the rotatable signal-inducing unit comprising a center electrode disposed in a signal-inducing unit plane and a rotary electrode disposed in the signal-inducing unit plane, the rotary electrode being conductively connected to the center electrode and laterally offset therefrom, the rotational angle sensor comprising:
    a sensor unit comprising:
        a first sensor electrode disposed in a sensor plane; and
        at least one second sensor electrode disposed in the sensor plane,
        wherein the sensor electrodes are arranged in a circle around a ground electrode disposed in the sensor plane, and
        wherein a center of the ground electrode defines a center of the center electrode, and
    an evaluation unit, the evaluation unit being connected to the sensor electrodes and the ground electrode and configured to perform the steps of the method according to claim 1.

5. The rotational angle sensor according to claim 4, including the signal-inducing unit, wherein the signal-inducing unit plane is oriented substantially parallel to the sensor plane.

6. A household appliance having a rotational angle sensor according to claim 4, the sensor plane of the sensor device being disposed on an inner side of a control panel of the household appliance and the signal-inducing unit plane being disposed on an outer side of the control panel, the signal-inducing unit being non-rotatably coupled to a control element of the household appliance and rotatably supported on the outer side, an axis of rotation of the control element substantially corresponding to the centers of the center electrode and the ground electrode, and the evaluation unit being connected to the sensor electrodes and the ground electrode.

7. A non-transitory computer-readable medium comprising a program code for performing the method of claim 1 when the program code is executed on a device.

* * * * *